(12) United States Patent
Gibbs

(10) Patent No.: US 7,778,227 B2
(45) Date of Patent: Aug. 17, 2010

(54) SYSTEM AND METHOD FOR ERASING A DATA FRAMES QUEUE ON A MOBILE DEVICE

(75) Inventor: Fraser Gibbs, Waterloo (CA)

(73) Assignee: Research In Motion Limited, Waterloo (CA)

(*) Notice: Subject to any disclaimer, the term of this patent is extended or adjusted under 35 U.S.C. 154(b) by 1181 days.

(21) Appl. No.: 10/645,283

(22) Filed: Aug. 21, 2003

(65) Prior Publication Data
US 2004/0253946 A1 Dec. 16, 2004

Related U.S. Application Data

(60) Provisional application No. 60/404,913, filed on Aug. 22, 2002.

(51) Int. Cl.
*H04W 4/00* (2009.01)
(52) U.S. Cl. ............... 370/338; 370/331; 455/422.1
(58) Field of Classification Search ........... 370/331, 370/412, 329, 338, 395.21, 469; 455/422.1
See application file for complete search history.

(56) References Cited

U.S. PATENT DOCUMENTS

| | | | | |
|---|---|---|---|---|
| 6,104,928 | A * | 8/2000 | Waugh | 455/445 |
| 6,275,713 | B1 | 8/2001 | Toda | 455/564 |
| 6,463,055 | B1 * | 10/2002 | Lupien et al. | 370/353 |
| 6,816,471 | B1 * | 11/2004 | Ludwig et al. | 370/331 |
| 6,904,025 | B1 * | 6/2005 | Madour et al. | 370/328 |
| 6,954,791 | B2 * | 10/2005 | Darby | 709/227 |
| 7,039,404 | B2 * | 5/2006 | Das et al. | 455/435.1 |
| 7,080,405 | B2 * | 7/2006 | Himmel et al. | 726/4 |
| 7,139,585 | B2 * | 11/2006 | Hachimura et al. | 455/462 |
| 7,180,879 | B2 * | 2/2007 | Sinnarajah et al. | 370/335 |
| 7,197,034 | B2 * | 3/2007 | Muhonen | 370/392 |
| 2001/0018342 | A1 | 8/2001 | Vialen et al. | 455/423 |

FOREIGN PATENT DOCUMENTS

WO 01/28185 A1 4/2001
WO WO 01 95660 A1 12/2001

OTHER PUBLICATIONS

CIPO; Office Action dated Dec. 18, 2007 for Application No. 2,438,051 (5 pgs).
EPO; Communication dated Nov. 21, 2003 for Application No. 03255203.6 (search report) (3 pgs).
EPO; Communication pursuant to Article 96(2) EPC dated Sep. 9, 2004 for Application No. 03255203.6 (3 pages).

* cited by examiner

*Primary Examiner*—Ricky Ngo
*Assistant Examiner*—Chandrahas Patel
(74) *Attorney, Agent, or Firm*—Jones Day; Krishna K. Pathiyal; Robert C. Liang

(57) ABSTRACT

In accordance with the teachings described herein, systems and methods are provided for managing communications between a mobile device and a wireless network. The mobile device may include an executable network management program that causes the mobile device to terminate a first communication link with the wireless network while in an out-of-coverage state, and queue data in the mobile device relating to the first communication link. The network management program may further cause the mobile device to receive instructions to establish a second communication link between the mobile device and the wireless network, and delete the queued data relating to the first communication link.

50 Claims, 6 Drawing Sheets

SYSTEM AND METHOD FOR ERASING A DATA FRAMES QUEUE ON A MOBILE DEVICE

CROSS-REFERENCE TO RELATED APPLICATION

This application claims priority from and is related to the following prior application: "Erasing Data Frames Queue On A Mobile Device," U.S. Provisional Application No. 60/404,913, filed Aug. 22, 2002. This prior application, including the entire written description and drawing figures, is hereby incorporated into the present application by reference.

FIELD

The technology described in this patent document relates generally to the field of connection management in wireless networks. More particularly, the patent document describes a system and method for erasing a data frames queue in a mobile device, which is particularly well-suited for General Packet Radio Service (GPRS) connection management.

BACKGROUND

When a mobile device connected to a wireless GPRS network goes out of coverage, the device typically does not immediately disconnect from the network. Rather, a typical mobile device will queue outgoing data frames for transmission one coverage is re-established. These queued data frames may include user data, network control data (e.g., a GPRS attach request, a Packet Data Protocol (PDP) context request, etc.), or other information.

If the initial network connection is still valid when coverage is re-established, then the queued data frames may be transmitted from the mobile device to the network with no interruption in communication. However, if the initial network connection is no longer valid once the mobile device comes back into coverage, then the mobile device may send invalid or out-of-context queued data frames to the network. This situation may occur, for example, if the mobile device terminates the network connection while out of coverage. If invalid or out-of-context data frames are processed by the network, then synchronization may be lost between the mobile device and the network, resulting in an interruption in communication.

SUMMARY

In accordance with the teachings described herein, systems and methods are provided for managing communications between a mobile device and a wireless network. The mobile device may include a memory subsystem, a communication subsystem and a processing subsystem. The communication subsystem may be operable to transmit and receive data over the wireless network. The processing subsystem may be coupled to the memory subsystem and the communication subsystem and may be operable to store and retrieve data in the memory subsystem, to execute instructions stored in the memory subsystem, and to cause the communication subsystem to transmit and receive data over the wireless network.

The mobile device may further include an executable network management program stored in the memory subsystem. The network management program may cause the mobile device to terminate a first communication link with the wireless network while in an out-of-coverage state, and queue data in the mobile device relating to the first communication link. The network management program may further cause the mobile device to receive instructions to establish a second communication link between the mobile device and the wireless network, and delete the queued data relating to the first communication link.

DETAILED DESCRIPTION

Figure 1:
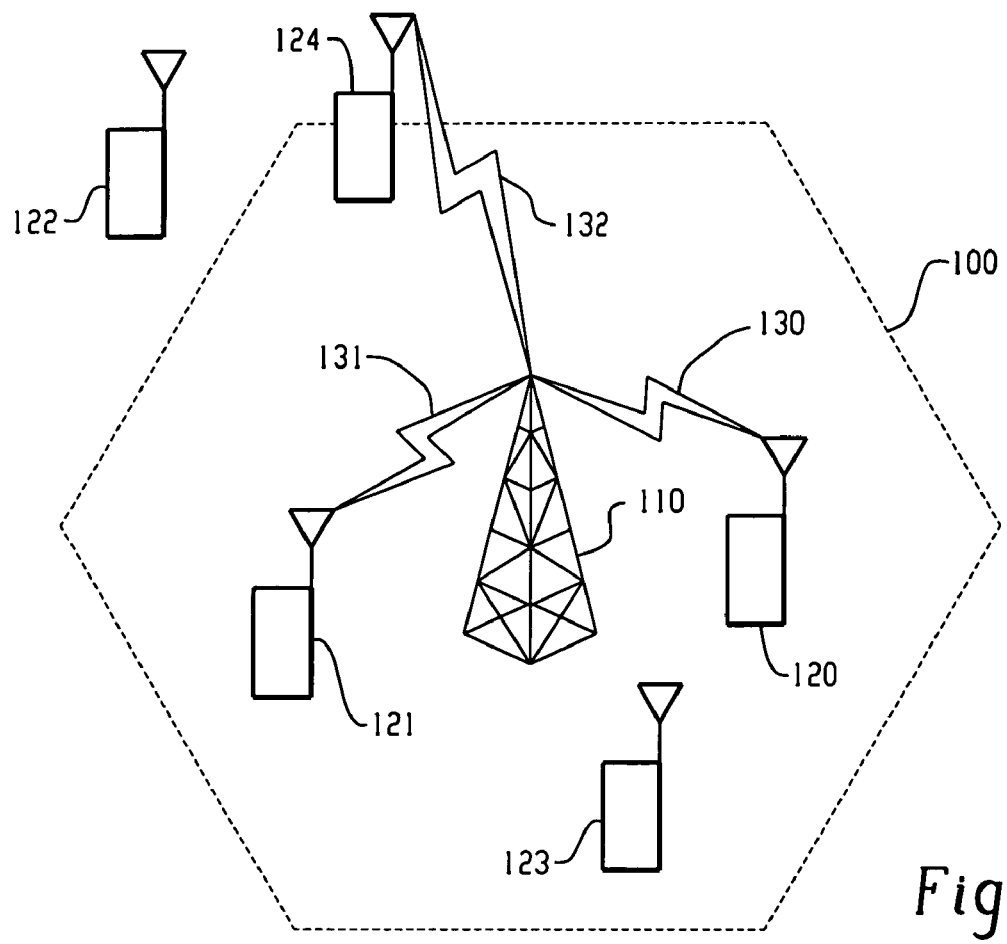
FIG. 1 is a block diagram showing mobile devices in and out of network coverage.

With reference now to the drawing figures, FIG. 1 is a block diagram showing mobile devices in and out of network coverage. More particularly, FIG. 1 illustrates three (3) mobile devices 120, 121, 123 located within a coverage area 100 for a network base station 110, one (1) mobile device 122 located outside of the coverage area 100, and one (1) mobile device 124 located in a fringe coverage area near the border of the base station coverage area 100. The mobile devices 120, 121, 123 within the coverage area 100 may communicate with the base station 110. The mobile device 124 on the border of the coverage area 100 may receive intermittent coverage as it moves in and out of the coverage area 100.

In addition, FIG. 1 also illustrates different network connection states 130-132 between the mobile devices and the base station. The connection state 130 between mobile device 120 and the base station 110 represents a full packet data protocol (PDP) context with the wireless network, which enables the mobile device 120 to exchange packet data units (PDUs) with the wireless network. The connection states 131, 132 between the base station 110 and mobile devices 121 and 124 illustrate a GPRS Mobile Mobility (MM) Context, in which a PDP context has not been initiated, and the mobile device 121, 124 cannot exchange PDUs with the wireless network. Mobile device 124 may be able to maintain the GPRS MM context 132 despite its intermittent network coverage. Mobile device 123, although within the coverage area 100, is not connected to the network. Mobile device 122 is out of coverage, and therefore does not have a connection to the network.

Figure 2:
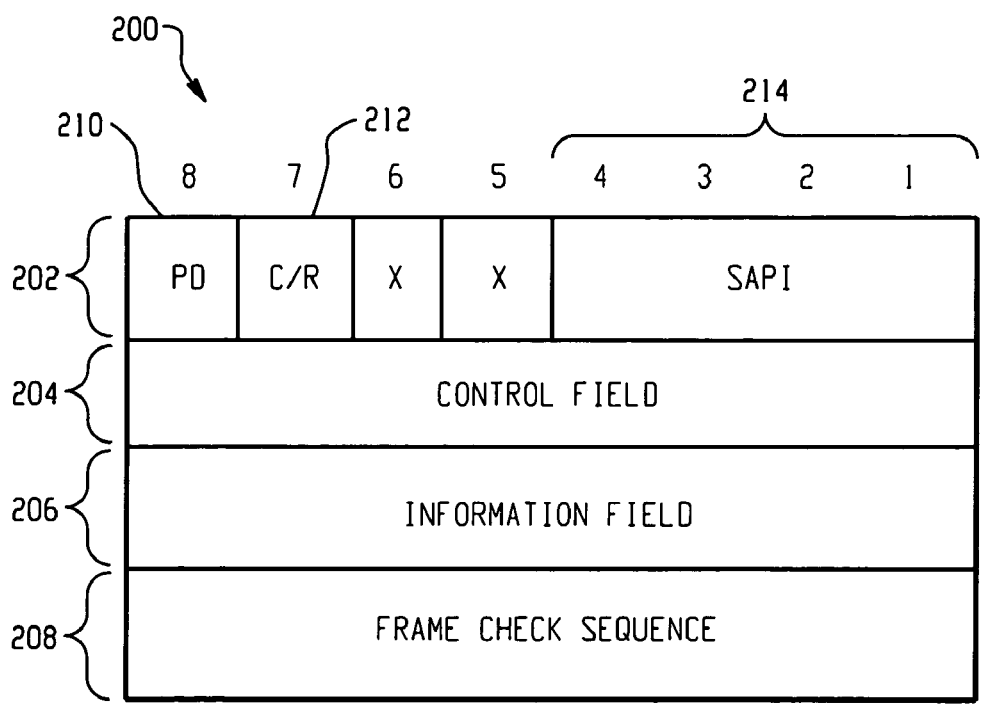
FIG. 2 is a diagram of an example data frame structure.

FIG. 2 is a block diagram of an example link logic control (LLC) data frame structure 200 that may be used to transfer PDUs between a mobile device and a GPRS network. The LLC frame 200 includes an address field 202, a control field 204, an information field 206, and a frame check sequence (FCS) 208. Additional detail regarding the LLC data frame structure 200 is included in the Logic Link Control (LLC) layer specification GSM 04.64, which is incorporated into the present application by reference.

The address field 202 includes a protocol discriminator (PD) bit 210, a command/response (CR) bit 212, and a service access point identifier (SAPI) 214. The PD bit 210 identifies the protocol of the frame structure 200. In an LLC data frame structure 200, the PD bit 210 is typically set to 0, and a frame with the PD bit 210 set to 1 is typically invalid. The CR bit 212 identifies whether the frame 200 is a command or a response. If the device sends a command to the network, then the CR bit 212 is typically set to 0. If the network sends a command to the device, then the CR bit 212 is typically set to 1. The SAPI 214 identifies the data link controller identifier for which a frame is intended.

The control field 204 identifies the type of frame and typically consists of between one and three octets. Examples of control field formats include confirmed information transfer, supervisory functions, and unnumbered format. A confirmed information transfer format may be used to transmit end-user data between two devices. A supervisory format may be used to perform control functions, such as acknowledging transmitted frames. An unnumbered format may be used for control purposes, such as link initialization, link disconnection, and other link control functions.

Typically, LLC frames 200 include an information field 206 which may contain various commands and responses. The information field 206 is typically only included, however, if the format of the control field 204 is an information transfer format.

The frame check sequence (FCS) field 208 may include a 24-bit cyclic redundancy check (CRC) code, which may be used to detect bit errors in the frame header and information fields.

Figure 3:
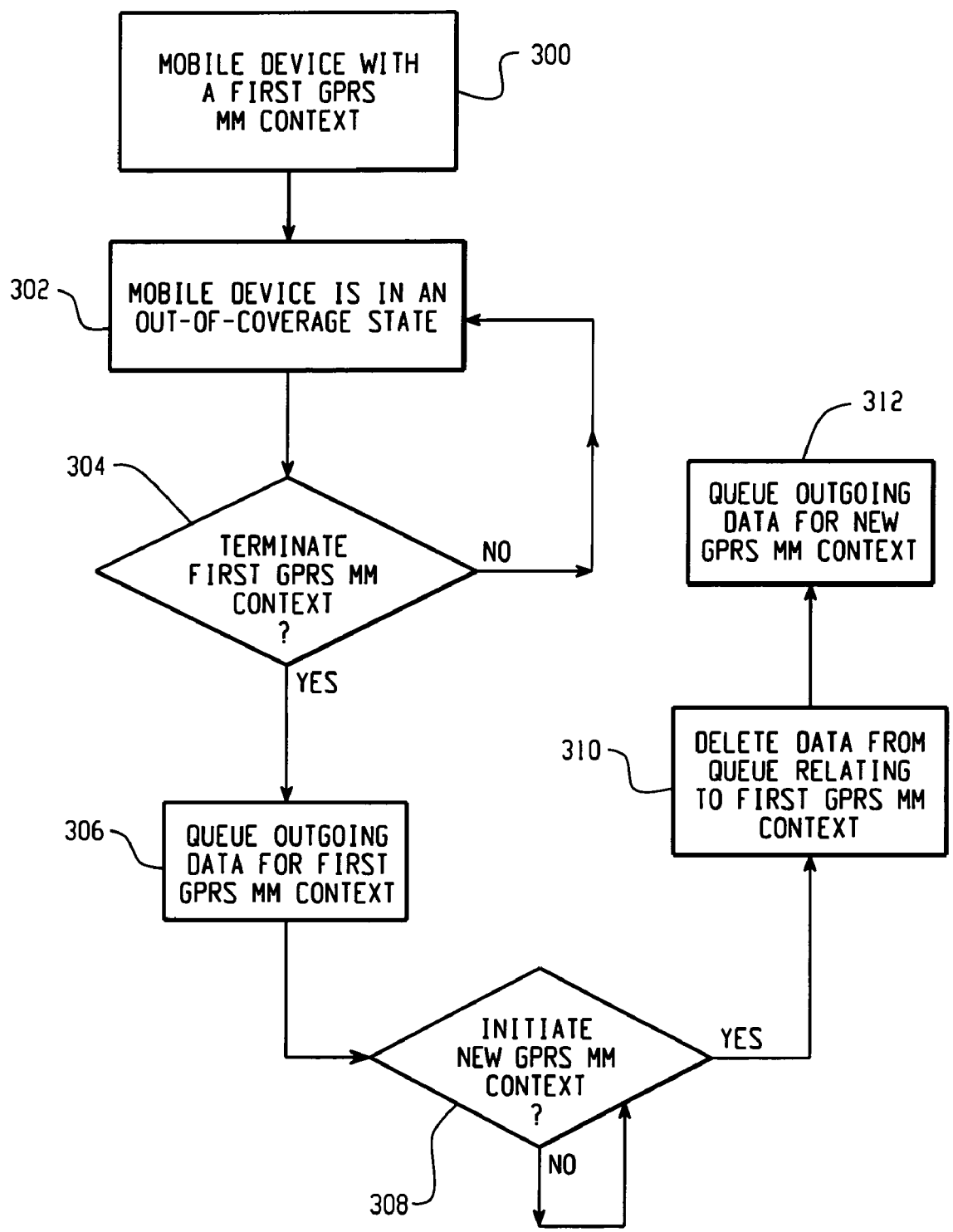
FIG. 3 is a flow diagram illustrating an example method for erasing invalid or out-of-context data frames from the mobile device queue.

FIG. 3 is a flow diagram illustrating an example method for erasing invalid or out-of-context data frames from the mobile device queue. The method shown in FIG. 3 may, for example, be performed by a network management program executed on a mobile device.

In step 300, a mobile device is connected to a wireless network with a GPRS MM context. In step 302, the mobile device goes out of network coverage. While out of coverage, in step 304, the method determines whether to terminate the existing GPRS MM context. If the GPRS MM context is not terminated, then the method returns to step 302 and the device holds its current state. If the GPRS MM context is terminated, however, then the method proceeds to step 306. The decision to terminate or not to terminate the GPRS MM context may, for example, be made by a mobile device user, a software timer, or some other suitable means.

In step 306, the device queues outgoing data in a local data store while waiting for coverage to be restored. For example, the device may queue outgoing control data (e.g., a GPRS Detach or PDP context deactivation request), user data, or other outgoing data relating to the GPRS MM Context to be terminated.

Before coverage is restored, the method determines in step 308 whether to initiate a new GPRS MM context. If the method determines that a new GPRS MM Context should be initiated, then the method proceeds to step 310. Otherwise, if a new GPRS MM context is not initiated, then the method remains at step 308. At step 310, any data still in the queue relating to the first GPRS MM Context, such as pre-existing user data or recently added control data (e.g., GPRS Detach or PDP deactivation data), is deleted to eliminate confusion between the network and the mobile device when the mobile device re-enters network coverage. After deleting the existing queued data, new outgoing data, such as a GPRS Attach, is queued in memory at step 312.

Figure 4:
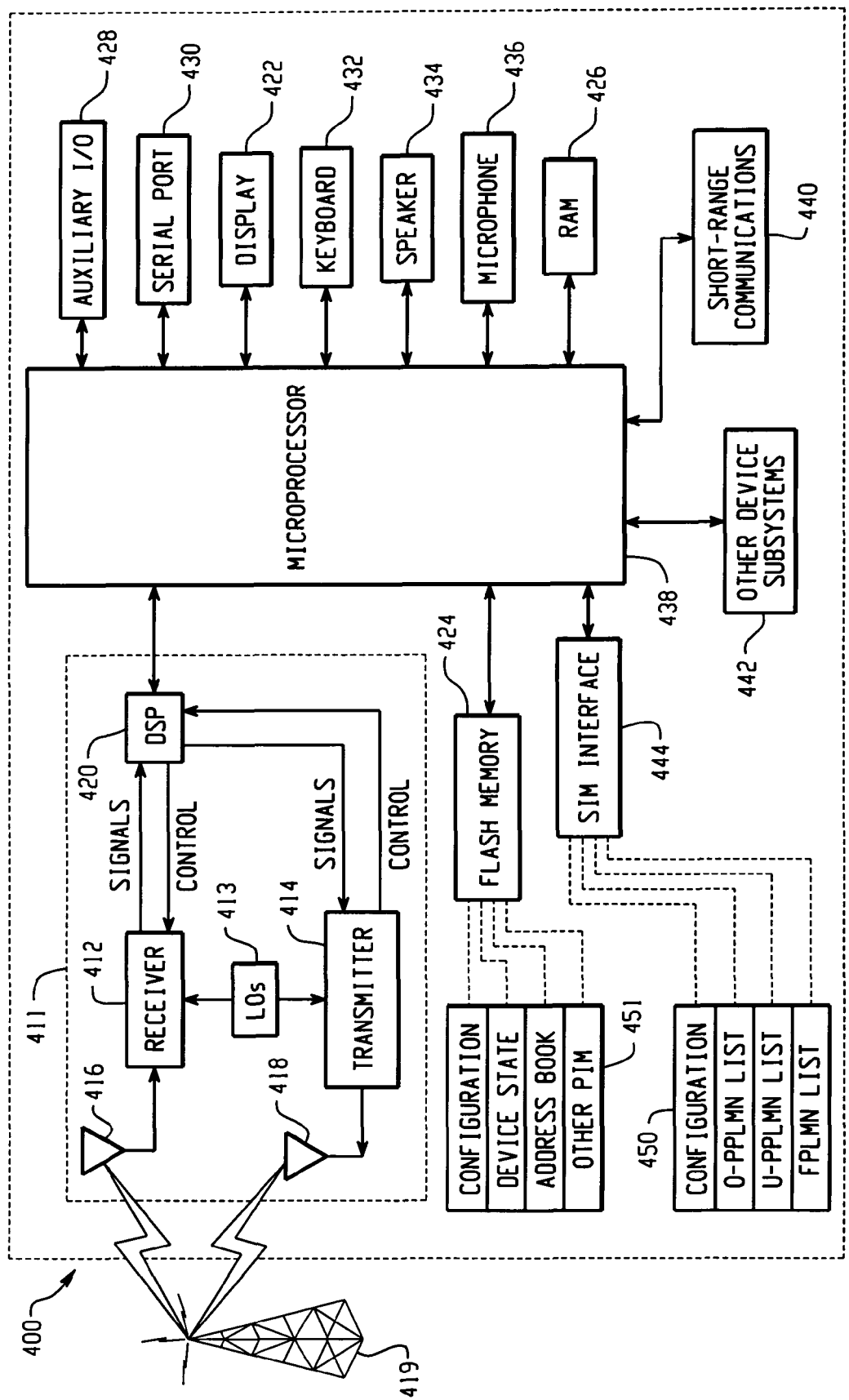
FIG. 4 is a block diagram of an example mobile device.

FIG. 4 is a block diagram of an example mobile device 400 that may be used with the systems and methods described herein. The mobile device 400 is preferably a two-way communication device having voice and data communication capabilities. The mobile device preferably has the capability to communicate with other computer systems on the Internet. Depending on the functionality provided by the device, the device may be referred to as a data messaging device, a two-way pager, a cellular telephone with data messaging capabilities, a wireless Internet appliance, a data communication device, or other device type.

If the mobile device 400 is enabled for two-way communications, then it may incorporate a communication subsystem 411, including both a receiver 412 and a transmitter 414, as well as associated components such as one or more antenna elements 416 and 418, local oscillators (LOs) 413, and a processing module such as a digital signal processor (DSP) 420. It should be understood, however, that the particular design of the communication subsystem 411 is dependent upon the communication network in which the device is intended to operate. For example, a mobile device 400 may include a communication subsystem 411 designed to operate within the Mobitex™ mobile communication system, the DataTAC™ mobile communication system, and/or a GPRS network.

Network access requirements may also vary depending upon the type of network 419. For example, in the Mobitex and DataTAC networks, mobile devices 400 are registered on the network using a unique identification number associated with each mobile device. In GPRS networks, however, network access is associated with a subscriber or user of a mobile device 400. A GPRS mobile device therefore requires a subscriber identity module, commonly referred to as a SIM card 444, in order to operate on a GPRS network. The SIM card 444 may store configurations, identification and subscriber related information 450. The O-PPLMN, the U-PPLMN and the forbidden PPLMN (FPLMF) 450 are initially received from the SIM card 444, Reference to the PPLMN hereinafter will generally apply to both the O-PPLMN and U-PPLMN.

When required network registration or activation procedures have been completed, a mobile device 400 may send and receive communication signals over the network 419. Signals received by the antenna 416 through a communication network 419 are input to the receiver 412, which may perform typical receiver functions, such as signal amplification, frequency down conversion, filtering, channel selection and the like, and in the example system shown in FIG. 4, analog to digital conversion. Analog to digital conversion of a received signal allows more complex communication functions (e.g., demodulation and decoding) to be performed in the DSP 420. Similarly, signals to be transmitted by the mobile device are processed (e.g., modulated and encoded) by the DSP 420 and input to the transmitter 414 for digital to analog conversion, frequency up conversion, filtering, amplification and transmission over the communication network 419 via the antenna 418.

The DSP 420 may also provide receiver and transmitter control. For example, the gains applied to communication signals in the receiver 412 and transmitter 414 may be adaptively controlled through automatic gain control algorithms implemented in the DSP 420.

The mobile device 400 preferably includes a microprocessor 438, which controls the overall operation of the device. Communication functions, such as data and voice communications, are performed through the communication subsystem 411. The microprocessor 438 also interacts with further device subsystems, such as the display 422, flash memory 424, random access memory (RAM) 426, auxiliary input/output (I/O) subsystems 428, serial port 430, keyboard 432, speaker 434, microphone 436, short-range communications subsystem 440 and any other device subsystems generally designated as 442. For example, the microprocessor 438 may queue outgoing transmissions in the RAM 426 while the mobile device 400 is out-of-coverage with the wireless network 419. The microprocessor 438 may also execute a software application to perform mobile mobility (MM) and other network management functions, such as those described above with reference to FIG. 3.

Some of the subsystems shown in FIG. 4 perform communication-related functions, whereas other subsystems may provide "resident" or on-device functions. In addition, some subsystems, such as the keyboard 432 and the display 422, may be used for both communication-related functions and device-resident functions.

Operating system software used by the microprocessor 438 may be stored in a persistent store such as flash memory 424, but could also be stored in a read only memory (ROM) or similar storage element. The operating system, specific device applications, or parts thereof, may be temporarily loaded into a volatile store such as RAM 426. Received communication signals and queued outgoing communication signals may also be stored to RAM 426.

As shown, the flash memory 424 can be segregated into different areas for computer programs and program data storage 451. These different PIM storage types indicate that each program can allocate a portion of flash memory 424 for their own database requirements. The microprocessor 438, in addition to its operating system functions, preferably enables execution of software applications on the mobile device. A predetermined set of applications that control basic operations, for example data and voice communication applications, may be installed on the mobile device 400 during manufacturing. A preferred software application may be a personal information manager (PIM) application having the ability to organize and manage data items relating to the user of the mobile device such as, but not limited to, e-mail, calendar events, voice mails, appointments, and task items.

One or more memory stores may be available on the mobile device to facilitate storage of PIM data items. Such PIM application may have the ability to send and receive data items via the wireless network 419. In a preferred embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or a non-volatile store for execution by the microprocessor 438.

In a data communication mode, a received signal such as a text message or web page download is processed by the communication subsystem 411 and input to the microprocessor 438, which preferably further processes the received signal for output to the display 422, or alternatively to an auxiliary I/O device 428. A user of mobile device 411 may also compose data items, such as email messages, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of the mobile device 400 is similar, except that received signals may be output to a speaker 434 and signals for transmission may be generated by a microphone 436. Alternative voice or audio I/O subsystems, such as a voice message recording subsystem, may also be implemented on the mobile device 400. Although voice or audio signal output is preferably accomplished primarily through the speaker 434, the display 422 may also be used to provide an indication of the identity of a calling party, the duration of a voice call, or other voice call related information for example.

The serial port 430 may be implemented in a personal digital assistant (PDA)-type mobile device for which synchronization with a user's desktop computer may be desirable, but is an optional device component. Such a port 430 may enable a user to set preferences through an external device or software application and may extend the capabilities of the mobile device 400 by providing information or software downloads to the mobile device 400 by means other than via a wireless communication network. This alternate download path may, for example, be used to load an encryption key onto the device through a direct and thus reliable and trusted connection to enable secure device communication.

A short-range communications subsystem 440 may provide communication between the mobile device 400 and different systems or devices, which need not necessarily be similar devices. For example, the subsystem 440 may include an infrared device and associated circuits and components or a Bluetooth™ communication module to provide for communication with similarly-enabled systems and devices.

Figure 5:
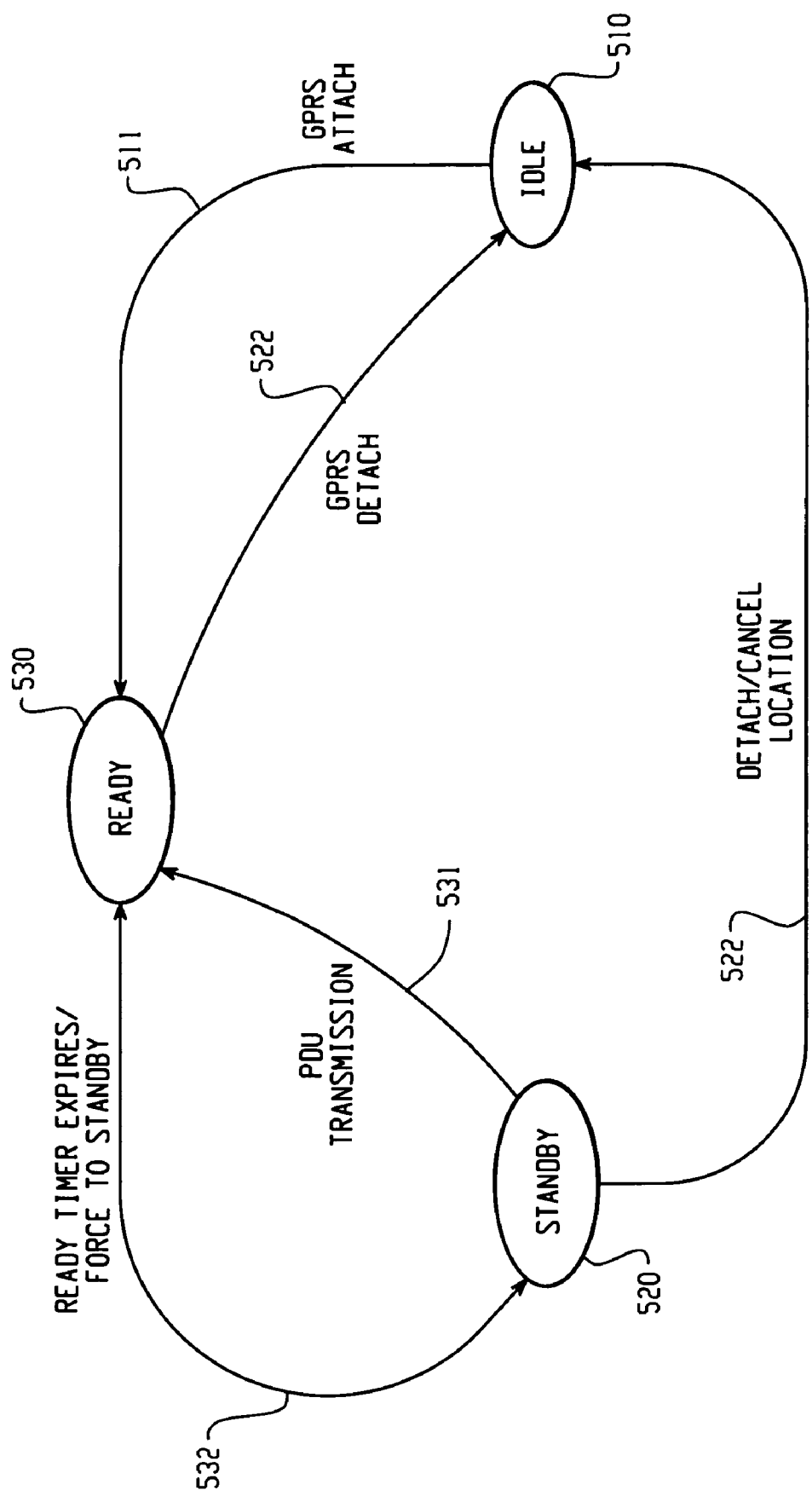
FIG. 5 is a state diagram illustrating example states of a GPRS mobile device.

FIG. 5 is a state diagram illustrating three mobility management (MM) states of a GPRS mobile device, the IDLE state 510, the STANDBY state 520, and the READY state 530. In the IDLE state 510, the mobile device has not attached to a GPRS Support Node (SGSN) and is therefore not monitored by the GPRS network. The only receiver infrastructure required to be supported in the IDLE state 510 is the storage of the mobile device's records in the home location register (HLR). In the STANDBY state 520, the mobile device is attached and is actively monitored by the GPRS network, but no data transmission occurs. That is, network resources are used in the STANDBY state 520 for mobility management so that the network knows the location of the mobile station. In the READY state 530, the mobile device is attached and data may be transferred between the mobile device and the GPRS network.

A mobile device may transition between states with the occurrence of certain mobility management events, illustrated by the arrows in FIG. 5. To transition from the IDLE state 510 to the READY state 530, the mobile device may initiate a GPRS Attach 511 message. If the mobile device successfully attaches to the network, then the mobile device will be monitored by the network through the Serving GPRS Support Node (SGSN). If the GPRS Attach 511 fails, however, then the mobile device remains in the IDLE state 510. Following a successful GPRS Attach 511, a Mobile Mobility (MM) context is active at the mobile device and the SGSN.

In the READY state 530, a Packet Data Protocol (PDP) context may be activated, which allows the user of the mobile device to establish a packet data session with the associated packet data networks (PDNs). In particular, the activation of a PDP context will associate a PDN address within the mobile device and Gateway GPRS Support Node (GGSN). Within a valid PDP context, Protocol Data Units (PDUs) may be transferred between the mobile device and the network.

When the transmission of PDUs is complete, a Ready Timer is started, which typically has an expiration time of 32 seconds, but may be set to other values. After the expiration of the ready timer 532, the mobile device changes from the READY state 530 to the STANDBY state 520. The mobile device can also be forced into the STANDBY state 520, without regard to the status of the Ready Timer and the transmission of PDUs, if the mobile device receives a Force to Standby Signal from the SGSN.

To transition from the STANDBY state 520 back into to the READY state 530, a PDU transmission 531 may be required, either from the wireless network or the mobile device. When there are PDUs to transmit/receive, the mobile device and SGSN will enter the READY state 530 and activate a PDP context.

To transition from a STANDBY state 520 to an IDLE state 510, an explicit GPRS Detach or Cancel Location 522 may be required. This change of state removes both the PDP and MM contexts.

To transition from a READY state 530 to an IDLE state 510, a GPRS Detach or Cancel Location 522 may be required. This change of state also removes both PDP and MM contexts.

A PDP Context may be initiated by either the mobile device or the network while the mobile device is in the STANDBY or READY state. The PDP Context contains the mapping and routing information necessary to transfer packet data units (PDUs) between a mobile and the Gateway GPRS Support Node (GGSN) (or vice versa). During the PDP context activation procedure a number of working parameters may be negotiated, such as the allocation of a PDP address, the provision of an access point name (APN) to an external network and GGSN, and the provision of the quality of service (QoS). The QoS parameter includes the negotiation of the priority required for the packet transfer, the reliability of the connection in terms of possible loss of data, the delay within the network, and the required throughput, or amount of data per second.

Figure 6:
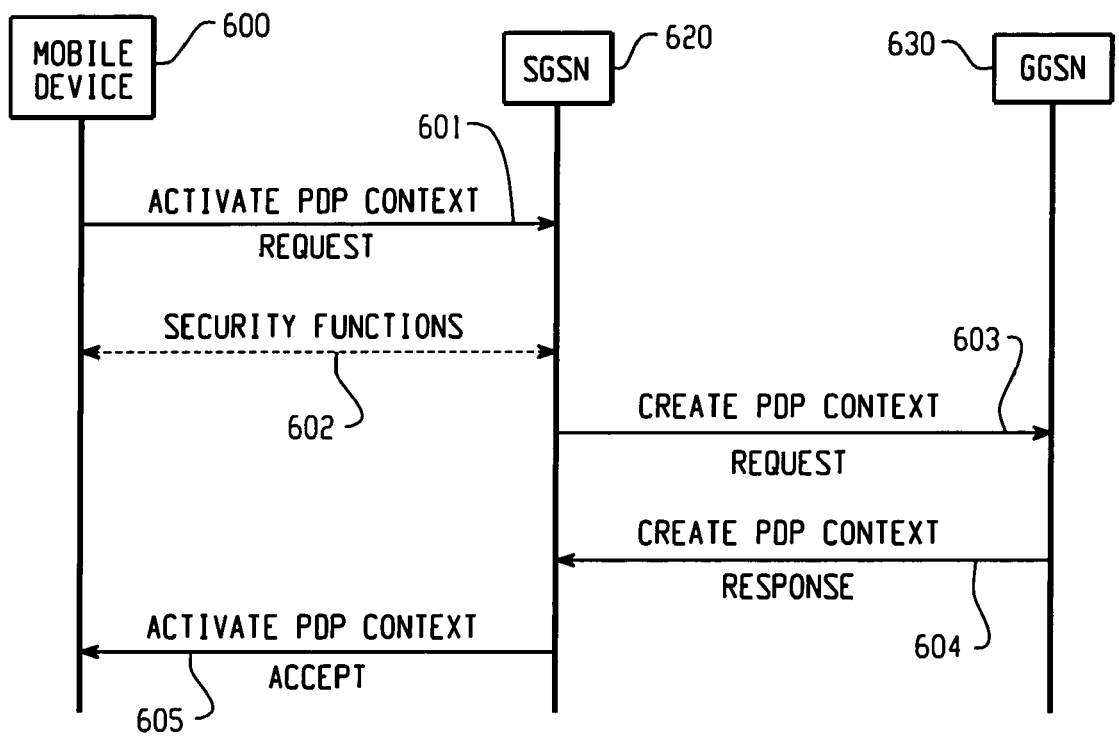
FIG. 6 is a diagram illustrating a PDP Context Activation Request initiated by a mobile device.

FIG. 6 is a diagram illustrating a PDP Context Activation Request initiated by a mobile device. The mobile device 600 sends an Activate PDP Context Request 601 to the Serving GPRS Support Node (SGSN) 620 over a wireless link. After this request, any necessary Security Functions 602 are negotiated between the SGSN 620 and the mobile device 600. The SGSN 620 then sends a Create PDP Context Request 603 to the Gateway GPRS Support Node (GGSN) 630. The GGSN 630 responds by sending a Create PDP Context Response 604 to the SGSN 620. The SGSN 620 then sends an Activate PDP Context Accept 605 to the mobile device 600.

A GPRS attach is performed when a mobile device indicates its presence to the network for the purpose of using the services provided by that network. Depending upon the mode of the network, this may be an IMSI (international mobile subscriber identity) attach for GSM circuit-switched services, a GPRS attach, or a combined IMSI/GPRS attach. (IMSI is a unique identifier for GSM networks that is associated with the SIM card of the mobile device.) The GPRS attach is made to the SGSN and includes information such as the mobile device's identification (IMSI or P-TMSI (packet-TMSI)) and the mobile device's position (indicated by the routing area identification). Upon receipt of this information, the SGSN authenticates the mobile device and informs the Home Location Register (HLR) of the mobile device's position.

When a GPRS attach is performed, the SGSN allocates a P-TMSI to the mobile station, which is used by the mobile station to derive another value known as the TLLI. The TLLI may be derived from at least four sources. One, a local TLLI may be derived, using the P-TMSI from the SGSN, which is only valid in the routing area associated with the P-TMSI. Two, a Foreign TLLI may be derived from a P-TMSI allocated in another routing area. Three, a Random TLLI may be chosen by the mobile device in the absence of a valid P-TMSI in order to determine a TLLI value. Four, an auxiliary TLLI may be used for anonymous access.

At any time, the network through the SGSN may issue a net P-TMSI, and as a result the mobile device should generate a new TLLI. The new TLLI is used to ensure a logical link between the mobile device and SGSN.

Figure 7:
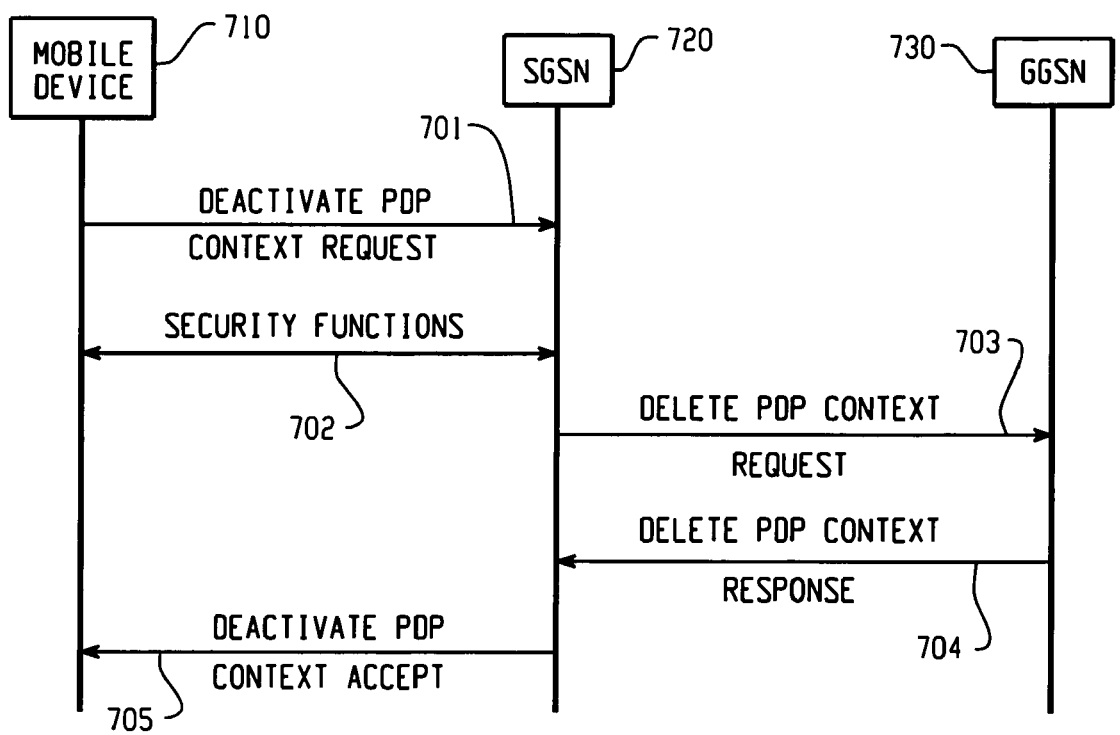
FIG. 7 is a diagram illustrating a PDP Context Deactivation Request initiated by a mobile device.

FIG. 7 is a diagram illustrating a PDP Context Deactivation Request initiated by a mobile device 710. The mobile device 710 sends a Deactivate PDP Context Request 701 to the SGSN 720. Any necessary security functions 702 are then negotiated between the mobile device 710 and SGSN 720. Once the security functions 702 are negotiated, the SGSN 720 sends a Delete PDP Context Request 703 to the GGSN 730. If successful, the GGSN 730 responds to the SGSN 720 with a Delete PDP Context Response 704. The SGSN 720 then sends a Deactivate PDP Context Accept 705 to the mobile device 710.

Figure 8:
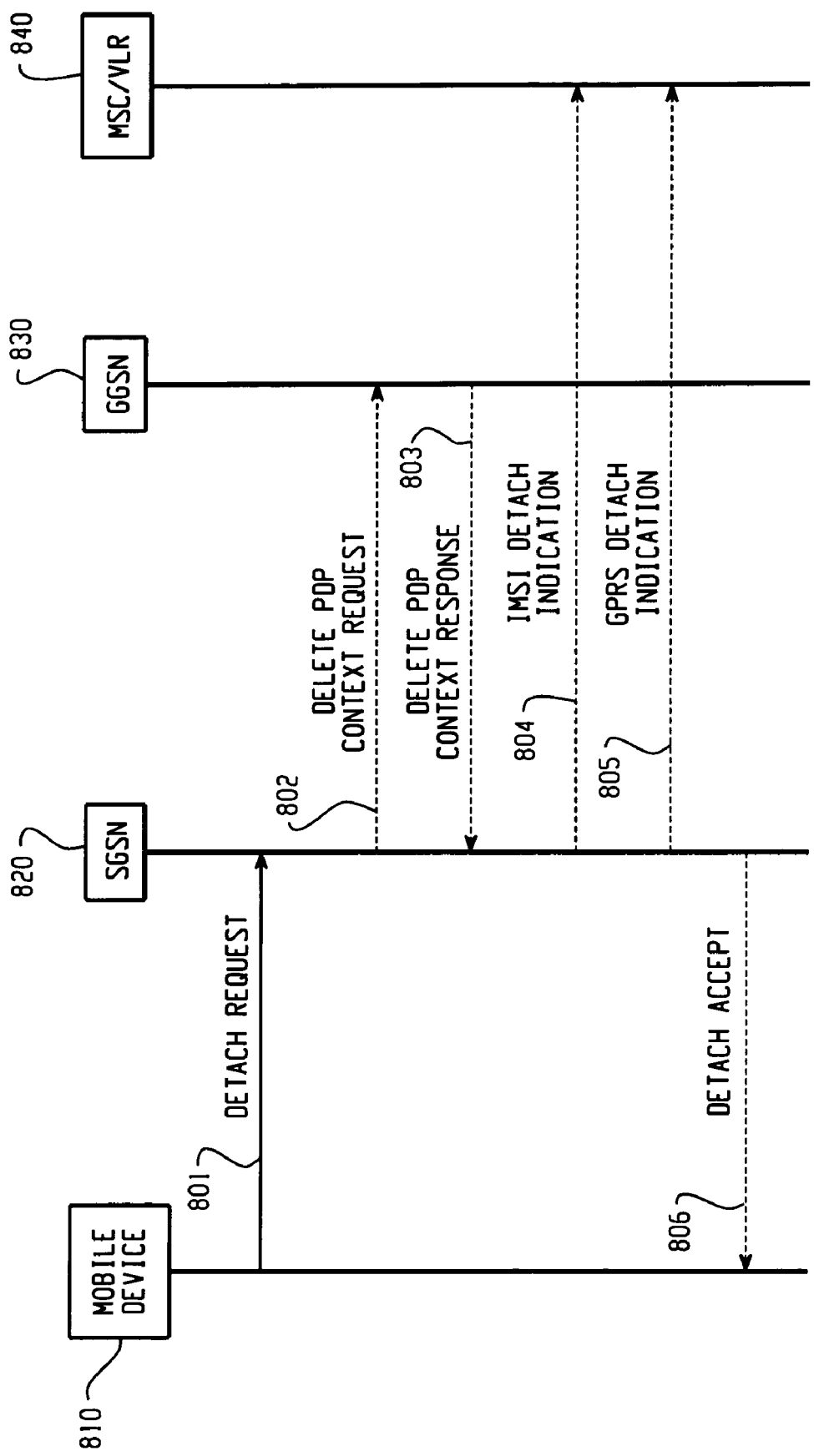
FIG. 8 is a diagram illustrating a GPRS Detach initiated by a mobile device.

FIG. 8 is a diagram illustrating a GPRS Detach initiated by a mobile device 810. The mobile device 810 sends a GPRS Detach Request 801 over a wireless network to the SGSN 820. The GPRS Detach request 801 may contain information, such as the GPRS Detach type indicating whether the IMSI connection should also be severed, and a Switch Off flag indicating whether the mobile station 810 is being powered down. If there is an active PDP context between the mobile device 810 and the GGSN 830, then the SGSN 820 sends a Delete PDP Context Request 802 to the GGSN 830. If successful, the GGSN 830 replies to the SGSN 820 with a Delete PDP Context Response 803. If the GPRS Detach type indicates that the IMSI connection should be severed, then a GPRS Detach Indication 804 is sent from the SGSN 820 to the Mobile Switching Center (MSC)/Virtual Location Register (VLR) 840. If the GPRS Detach Type indicates that only the GPRS connection is to be severed, maintaining the IMSI connection, then the SGSN 820 sends a GPRS Detach Indication 805 instead of the GPRS Detach Indication 804. Then, if the Switch Off flag sent along with the GPRS Detach request indicates that the mobile device 810 is remaining powered on, then the SGSN 820 sends a Detach Accept 806 to the mobile station 810.

This written description uses examples to disclose the invention, including the best mode, and also to enable a person skilled in the art to make and use the invention. The patentable scope of the invention may include other examples that occur to those skilled in the art.

The invention claimed is:

1. A method of managing communications between a mobile device and a wireless network, comprising:

establishing a first general packet radio service (GPRS) mobile management (MM) context for the mobile device to enable communication with the wireless network;

terminating the first GPRS MM context while the mobile device is out of network coverage of any GPRS wireless network;

in response to the termination of the first GPRS MM context while the mobile device is out of network coverage of any GPRS wireless network, queuing a first set of data in a local data store associated with the first GPRS MM context, wherein the first set of data includes one or more information transfer data frames that include user data, the user data including at least one of email data, calendar data, voice mail data, and task item data;

making a decision to establish a second GPRS MM context to re-establish communication with the wireless network;

in response to the establishment of a second GPRS MM context, deleting the first set of data associated with the first GPRS MM context; and queuing a second set of data in the local data store associated with the second GPRS MM context.

2. The method of claim 1, wherein the first set of data associated with the first GPRS MM context includes a mobile device identifier.

3. The method of claim 1, wherein a decision to terminate the first GPRS MM context is made by a mobile device user.

4. The method of claim 1, wherein the first set of data associated with the first GPRS MM context includes network control data.

5. The method of claim 4, wherein the first set of data associated with the first GPRS MM context includes a GPRS detach request.

6. The method of claim 5, wherein the first set of data associated with the first GPRS MM context includes a detach type.

7. The method of claim 6, wherein the detach type includes a GPRS detach.

8. The method of claim 5, wherein the first set of data associated with the first GPRS MM context includes a mobile device status flag.

9. The method of claim 8, wherein the first set of data associated with the first GPRS MM context includes a temporary logical link identifier (TLLI).

10. The method of claim 8, wherein the first data set associated with the first GPRS MM context includes an international mobile subscriber identity (IMSI).

11. The method of claim 8, wherein the first set of data associated with the first GPRS MM context includes a packet temporary mobile subscriber identity (P-TMSI).

12. The method of claim 1, wherein the decision to establish the second GPRS MM context is made by a mobile device user.

13. The method of claim 1, wherein the second set of data associated with the second GPRS MM context includes a GPRS attach request.

14. The method of claim 13, wherein the second set of data associated with the second GPRS MM context includes an international mobile subscriber identity (IMSI).

15. The method of claim 13, wherein the second set of data associated with the second GPRS MM context includes a packet temporary mobile subscriber identity (P-TMSI).

16. The method of claim 13, wherein the second set of data associated with the second GPRS MM context includes an attach type.

17. The method of claim 1, wherein the decision to establish the second GPRS MM context is made by a software module resident on the mobile device.

18. The method of claim 1, wherein a decision to terminate the first GPRS MM context is made by a software module resident on the mobile device.

19. The method of claim 18, wherein the decision to terminate the first GPRS MM context made by the software module is based on the expiration of a software timer.

20. A method for managing communications between a mobile device and a wireless network, comprising:

establishing a first packet data protocol (PDP) context for a mobile device to establish data communication with the wireless network;

terminating the first PDP context while the mobile device is out of network coverage with any wireless data network;

in response to the termination of the first PDP context while the mobile device is out of network coverage with any wireless data network, queuing a first set of data in a local data store associated with the first PDP context, wherein the first set of data includes one or more information transfer data frames that include user data, the user data including at least one of email data, calendar data, voice mail data, and task item data;

making a decision to establish a second PDP context for the mobile device to re-establish data communication with the wireless network;

in response to the establishment of the second PDP context, deleting the first set of data associated with the first PDP context; and queuing a second set of data in the local data store associated with the second PDP context.

21. The method of claim 20, wherein a decision to terminate the first PDP context is made by a mobile device user.

22. The method of claim 20, wherein the decision to establish the second PDP context is made by a mobile device user.

23. The method of claim 20, wherein a decision to terminate the first PDP context is made by a software module resident on the mobile device.

24. The method of claim 20, wherein the decision to establish the second PDP context is made by a software module resident on the mobile device.

25. The method of claim 20, wherein the first set of data associated with the first PDP context includes network control data.

26. The method of claim 25, wherein the first set of data associated with the first PDP context includes a deactivate PDP context request.

27. The method of claim 20, wherein the first set of data associated with the first PDP context includes a mobile device identifier.

28. The method of claim 27, wherein the first set of data associated with the first PDP context includes an international mobile subscriber identity (IMSI).

29. The method of claim 27, wherein the first set of data associated with the first PDP context includes a packet temporary mobile subscriber identity (P-TMSI).

30. The method of claim 27, wherein the first set of data associated with the first PDP context includes a temporary logical link identifier (TLLI).

31. The method of claim 20, wherein the second set of data associated with the first PDP context includes an activate PDP context request.

32. The method of claim 31, wherein the second set of data associated with the second PDP context includes a network service point access identifier (NSAPI).

33. The method of claim 31, wherein the second set of data associated with the second PDP context includes a PDP value.

34. The method of claim 31, wherein the second data associated with the second PDP context comprises a PDP address.

35. A method of managing communications between a mobile device and a wireless network, comprising:

establishing a first communication link between the mobile device and the wireless network;

detecting that the mobile device is out-of-coverage with any wireless network;

terminating the first communication link while the mobile device is out-of-coverage with any wireless network;

in response to the termination of the first communication link while the mobile device is out-of-coverage with any wireless network, queuing data in the mobile device relating to the first communication link, wherein the data includes one or more information transfer data frames that include user data, the user data including at least one of email data, calendar data, voice mail data, and task item data;

receiving instructions to establish a second communication link between the mobile device and the wireless network; and in response to the establishment of the second communication link, deleting from the mobile device the queued data relating to the first communication link;

the first and second communication links being to the same wireless network.

36. A mobile device for use in a wireless network, comprising:

a memory subsystem;

a communication subsystem operable to transmit and receive data over the wireless network;

a processing subsystem coupled to the memory subsystem and the communication subsystem and operable to store and retrieve data in the memory subsystem, to execute instructions stored in the memory subsystem, and to cause the communication subsystem to transmit and receive data over the wireless network; and executable network management program code stored in the memory subsystem and comprising instructions operable to cause the mobile device to perform the method of claim 35 when executed by the processing subsystem.

37. The mobile device of claim 36, wherein the wireless network is a general packet radio service (GPRS) network.

38. The mobile device of claim 37, further comprising:

a subscriber identity module (SIM) coupled to the processing subsystem and operable to store network identification information for the mobile device;

wherein the processing subsystem is operable to retrieve the network identification information stored in the SIM.

39. The mobile device of claim 36 wherein the memory subsystem includes a flash memory device and a random access memory (RAM) device.

40. The mobile device of claim 39, wherein the network management program code is stored in the flash memory device.

41. The mobile device of claim 39, wherein the data is queued in the RAM device.

42. The method of claim 35, wherein the wireless network is a general packet radio service (GPRS) network.

43. The method of claim 35, wherein the first communication link includes a general packet radio service (GPRS) mobile management (MM) context for the mobile device.

44. The method of claim 35, wherein the first communication link includes a packet data protocol (PDP) context for the mobile device.

45. The method of claim 35, further comprising:

queuing data in the mobile device relating to the second communication link.

46. The method of claim 35, wherein the instructions to establish a second communication link are received from a mobile device user.

47. The method of claim 35, wherein the instructions to establish a second communication link are received from a program executing on the mobile device.

48. The method of claim 35, further comprising:

prior to terminating the first communication link, receiving instructions to terminate the first communication link.

49. The method of claim 48, wherein the instructions to terminate the first communication link are received from a mobile device user.

50. The method of claim 49, wherein the instructions to terminate the first communication link are received from a program executing on the mobile device.

* * * * *